Sept. 20, 1966          P. F. GIRARD          3,273,827
PROPELLER-ROTOR HIGH LIFT SYSTEM FOR AIRCRAFT
Filed April 27, 1964          2 Sheets-Sheet 2
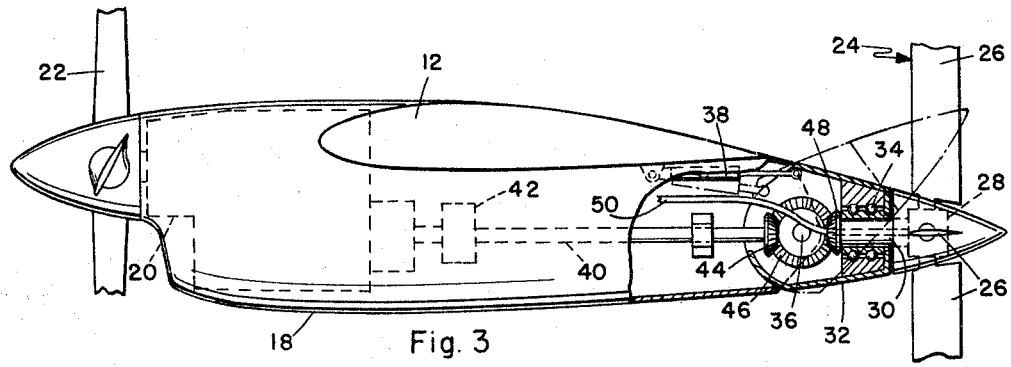
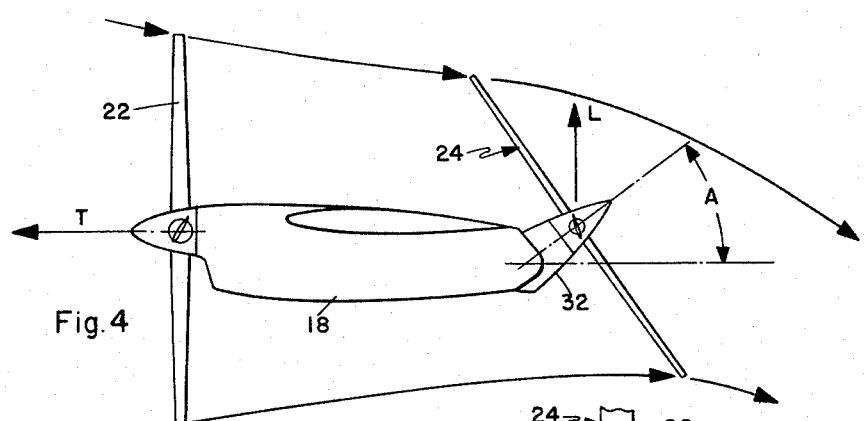
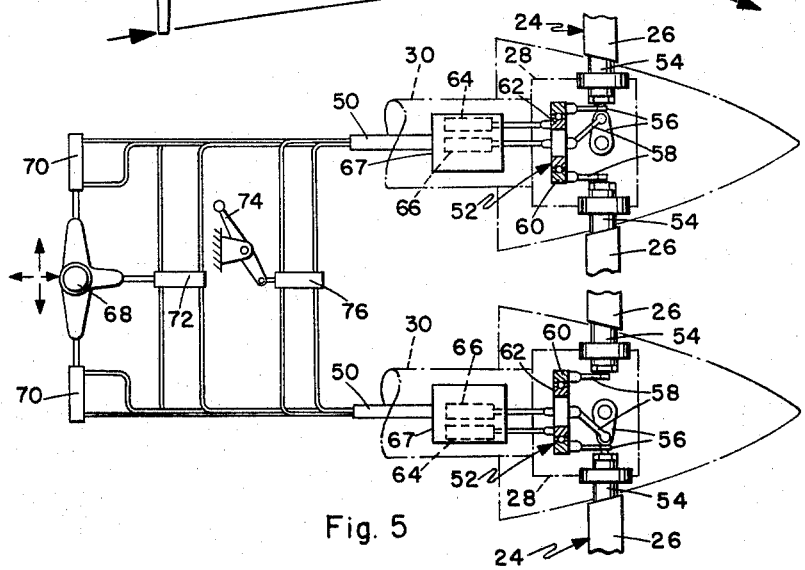
INVENTOR.
PETER F. GIRARD
BY
Knox & Knox

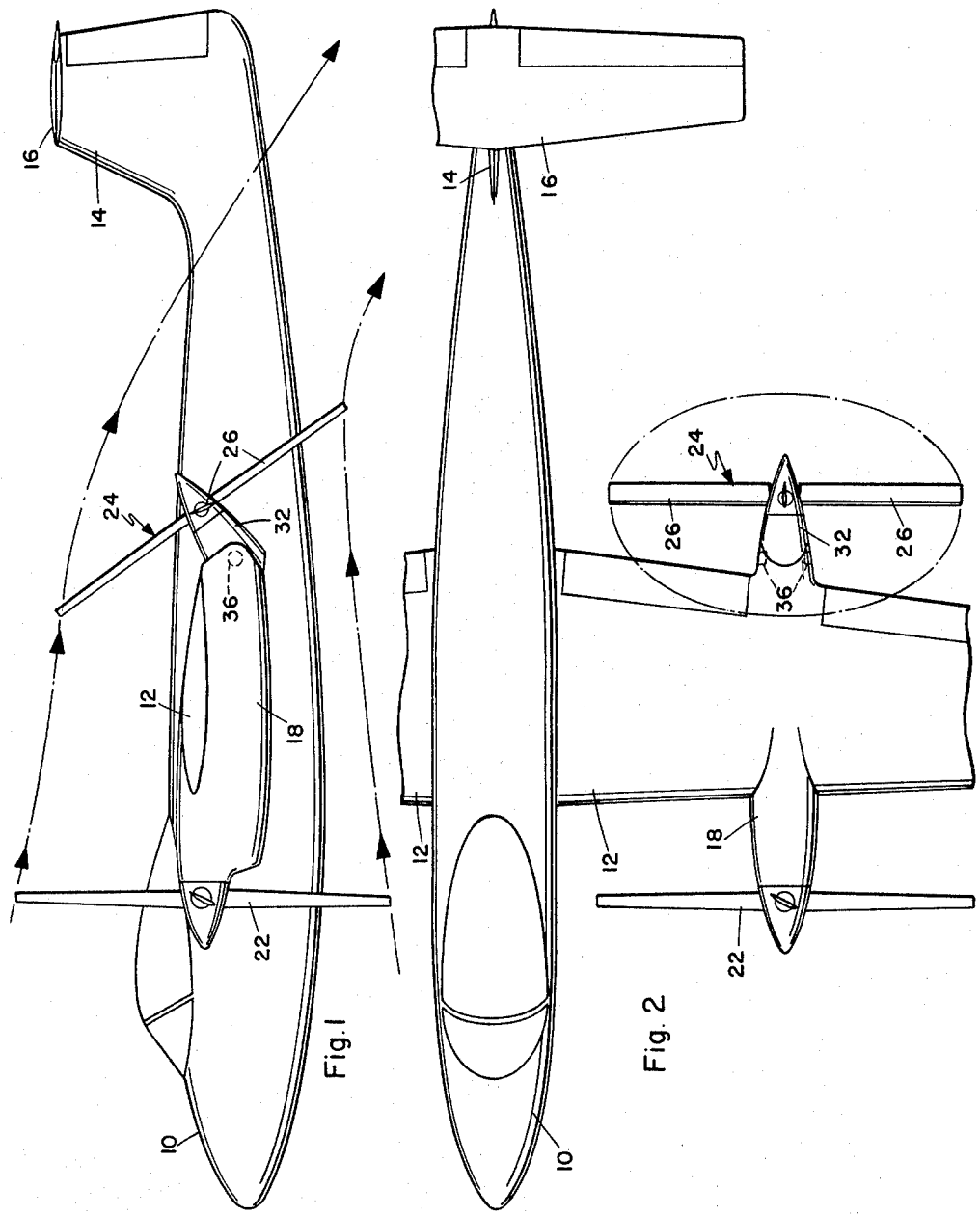

United States Patent Office 3,273,827
Patented Sept. 20, 1966

3,273,827
PROPELLER-ROTOR HIGH LIFT SYSTEM FOR AIRCRAFT
Peter F. Girard, La Mesa, Calif., assignor to The Ryan Aeronautical Co., San Diego, Calif.
Filed Apr. 27, 1964, Ser. No. 362,691
5 Claims. (Cl. 244—42)

This invention relates to aircraft and more particularly to a propeller-rotor high lift system for aircraft.

The primary object of this invention is to provide a high lift system for aircraft, wherein a lift producing rotor is disposed in the slipstream of a propulsion propeller to generate lift from the slipstream and cause a deflection of the air flow which also adds to the lift.

Another object of this invention is to provide a high lift system in which the rotor is adjustable to vary the lift and can be moved to a minimum drag inoperative position for high speed flight.

Another object of this invention is to provide a high lift system in which the rotor may be driven or allowed to auto-rotate, depending on the degree of lift and the overall performance required.

A further object of this invention is to provide a high lift system which, when applied to multi-engined aircraft, will allow pitch, roll and yaw control in hovering and low speed flight by variations in rotor action.

Another object of this invention is to provide a high lift system which is adaptable to existing types of propeller driven aircraft, by adding the rotor assembly to the rear of each engine nacelle.

In the drawings:

FIGURE 1 is a side elevation view of a typical aircraft incorporating the propeller-rotor system;

FIGURE 2 is a partial top plan view of the aircraft;

FIGURE 3 is an enlarged side elevation view of one propeller-rotor unit, partially cut away;

FIGURE 4 is a diagrammatic side view illustrating the lifting action; and

FIGURE 5 is a diagram of a suitable rotor control system.

Similar characters of reference indicate similar or identical elements and portions throughout the specification and throughout the views of the drawing.

BASIC SYSTEM

The system is illustrated as applied to a generally conventional twin engined aircraft having a fuselage 10, wings 12, a vertical tail fin 14 carrying a high mounted horizontal stabilizer 16, and an engine nacelle 18 on each wing. Each nacelle 18 contains an engine 20, of any suitable type, driving a conventional tractor propeller 22 with a fixed axis of rotation. At the rear end of nacelle 18 is a rotor 24 comprising a plurality of rotor blades 26 on a hub 28 which is carried on a rotor shaft 30. Rotor blades 26 have little or no twist as compared to the progressive twist or pitch change of a conventional propeller. The rear portion of nacelle 18 comprises a rotor mounting 32 in which rotor shaft 30 is journalled in a bearing 34, said rotor mounting being pivotally attached to the nacelle on transversely opposed hinges 36. An inclination control jack 38 connected between the rotor mounting 32 and nacelle 18 is operable to swing the rotor 24 in a substantially vertical plane parallel to the thrust axis of propeller 22 to incline the rotor relative to the propeller thrust axis.

Extending rearwardly from engine 20 is a drive shaft 40 incorporating a suitable clutch 42 and carrying at its rear end a drive gear 44, which engages a transfer gear 46 mounted to rotate about the axis of hinges 36. On rotor shaft 30 is a driven gear 48 engaging the transfer gear 46, so that the rotor can be driven at all angles of inclination.

Rotor hub 28 is of the variable pitch and feathering type, many such mechanisms being available and well known, a control extension 50 leading from said hub to a suitable control. Pilot actuated or automatic control means may be provided for rotor pitch and feathering control, rotor inclination by operation of jack 38 and for operation of clutch 42. The specific control system will depend on the particular aircraft and the internal services available.

ROTOR CONTROL SYSTEM

In multiple engined aircraft the rotors may be used for stabilizing and maneuvering the aircraft in hovering or low speed flight, when the aerodynamic surfaces are not sufficiently effective. This is accomplished by means such as that illustrated in FIGURE 5 wherein the dual rotors 24 and 24' are each controlled by a helicopter type swash plate 52. Each rotor blade 26 is mounted in hub 28 on a stub shaft 54 having a radial arm 56, which is connected by a link 58 to the rotating ring 60 of the swash plate 52. The inner non-rotating ring 62 of the swash plate is connected at spaced positions to a pair of actuators 64 and 66 in an actuating unit 67.

As illustrated, the swash plates are operated by a simple closed fluid system, the pilot's control stick 68 being coupled to roll control units 70 and a pitch control unit 72 which are appropriately connected to actuators 64 and 66. A collective control handle 74 coupled to a collective control unit 76 is also connected to actuators 64 and 66. Other control arrangements may be used, the manner in which the pilot's control stick and collective control operate rotor controlling swash plates being well known in the helicopter art. The system illustrated is merely one example of rotor blade pitch control mechanism, for obtaining a particularly wide range of control.

OPERATION

For take-off the engines 20 are started to drive propellers 22, the rotor mountings 32 then being inclined to the desired angle and blades 26 moved to the required pitch angle. Clutches 42 are engaged to drive the rotors 24 up to operating speed, but the power applied to the rotors is considerably less than that applied to propellers 22. The diameter of rotors 24 is sufficient to intercept substantially all of the airflow from propellers 22, the blades being at a very low pitch angle which, without the propeller air flow, would normally produce a thrust upwardly and to the rear. However, the high speed air flow from propellers 22 is intercepted by the slower moving and low pitched rotor blades 26, resulting in a lift reaction on the rotors. This lift effect is well known from wind tunnel tests with Autogiro type rotors. In the present aircraft the air flow is provided by the propellers and it has been found that a lift in excess of half the static thrust of the propellers can be produced without an increase in power requirements. In addition to producing a lift reaction, the air stream is turned downwardly behind rotors 24, as indicated by the directional arrows in FIGURES 1 and 4, adding to the overall lifting effect. The lift developed will be dependent on the rotor inclination relative to the propeller thrust axis, the rotor blade pitch, rotor rotational speed and propeller air stream velocity.

Once the rotors 24 are brought up to the required speed, clutches 42 can be disengaged allowing the rotors to auto-rotate in the manner of an Autogiro, resulting in a considerable decrease in the take-off run. In forward flight the dynamic pressure of the propeller air stream increases in proportion to forward speed and further increases lift reaction. By maintaining power to drive rotors 24 at auto-rotational speed, with the blade pitch at the proper angle, lift will be increased and the STOL (short take-off and landing) characteristics of the aircraft further enhanced.

When forward speed is sufficient for wings 12 to support the aircraft by aerodynamic lift the rotor mountings 32 are swung back to neutral position, in which the rotational axis of each rotor is parallel to the axis of its associated propeller. Blades 26 are then feathered to minimum drag position and the aircraft is in condition for high speed cruising flight, as in the full line posiiton in FIGURE 3.

For landing the aircraft is decelerated to minimum cruising speed and the rotor mounting 32 moved to the inclined position. Rotors 24 are then driven up to auto-rotational speed and blades 26 set to the required pitch angle. With the resultant high lift developed the aircraft can descend steeply and reduce the landing run to a minimum.

With sufficient power available lift can be developed to allow substantially vertical take-off and landing.

In the high lift configuration the rotor lift is developed behind the center of gravity of the aircraft and causes a nose down pitching action. However, the downwardly directed air flow aft of the rotors induces a downwash over the tail of the aircraft to counteract the nose down moment. If this downwash is insufficient in certain aircraft types, a cyclic pitch action may be imparted to the rotors, through the swash plate mechanisms, to stabilize the aircraft.

The cyclic pitch control of the rotors in unison provides pitch control, while differential cyclic pitch provides roll and yaw control in hovering and low speed flight, when the aerodynamic controls of the aircraft are ineffective. For instance, a greater lift on one rotor than on the other will induce a rolling moment into the aircraft, while an unequal lift on the outer portions of the rotor discs will cause a yawing action. Lateral cyclic variation of the rotors in unison will cause a sideways motion, the overall flight characteristics being somewhat similar to those of a helicopter. Thus the aircraft is fully controllable at all speeds, the rotors being effective during transition between low speed and high speed flight when the normal aerodynamic surfaces have a varying effect. Since the rotors are of the rigid rotor type, that is the blades are not hinged other than for pitch angle variation, the control moments obtainable are large. With the cyclic pitch control mechanism the feathering action for high speed flight is obtained by collective pitch control of all rotor blades through handle 74.

Even with a simple blade pitch change and feathering mechanism, and no cyclic control, the aircraft can be controlled at low speeds by lift variations of the rotors, caused by blade pitch changes or changes in the angle of inclination of individual rotors.

Conventional propeller driven aircraft can be converted to have STOL characteristics by adding the rotor assemblies to the rear of the existing engine nacelles and providing drive connections to the engines. On large aircraft auxiliary engines could be used to drive the rotors to avoid modification of the primary engines.

In the event of engine failure in flight the rotors may be allowed to auto-rotate and permit the aircraft to be landed in a minimum of space.

It is understood that minor variations from the form of the invention disclosed herein may be made without departure from the spirit and scope of the invention, and that the specification and drawings are to be considered as merely illustrative rather than limiting.

I claim:

1. In an aircraft having a driven primary propulsion propeller, high lift means, comprising:
    a bladed rotor mounted on the air craft rearwardly of said propeller to intercept substantially all the air flow from the propeller and being rotatable to retard the propeller airflow;
    said rotor being pivotally mounted to swing about an axis extending substantially parallel to the pitch axis of the aircraft;
    and means to move said rotor between a first position with the rotational axis thereof parallel to the rotational axis of said propeller and a second position with the rotor axis inclined to the propeller axis.

2. In an aircraft having a driven propulsion propeller with a fixed axis of rotation, high lift means, comprising.
    a bladed rotor mounted rearwardly of said propeller within the path of air flow from the propeller and being rotatable to retard the propeller air flow;
    said rotor being pivotally mounted to swing between one position with the rotational axis thereof substantially parallel to the rotational axis of said propeller and another position with the rotor axis inclined upwardly and rearwardly relative to the propeller axis; and
    means to move said rotor between said positions.

3. The structure according to claim 2 and including means to vary the blade pitch angle of said rotor.

4. The structure according to claim 3 and including means to drive said rotor.

5. In an aircraft having a plurality of driven propellers each with a fixed axis of rotation, a high lift system, comprising:
    a bladed rotor mounted rearwardly of each said propeller within the path of airflow from the propeller and being rotatable to retard the propeller airflow;
    each of said rotors being pivotally mounted to swing between one position with the rotational axis thereof substantially parallel to the rotational axis of the respective propeller and another position with the rotor axis inclined upwardly and rearwardly relative to the propeller axis;
    means to move said rotors between the said positions; and
    means to vary the blade pitch angles of said rotors cyclically, collectively and differentially.

References Cited by the Examiner

UNITED STATES PATENTS

| | | | |
|---|---|---|---|
| 2,082,376 | 6/1937 | Boettner | 244—7 X |
| 3,037,721 | 6/1962 | Stefanutti | 244—7 |
| 3,081,964 | 3/1963 | Quenzler | 244—7 |
| 3,159,361 | 12/1964 | Weiland | 244—7 |
| 3,179,354 | 4/1965 | Calderon | 244—12 |
| 3,181,810 | 5/1965 | Olson | 244—7 |
| 3,185,408 | 5/1965 | Higgs | 244—7 |
| 3,203,649 | 8/1965 | Girard | 244—42 |

MILTON BUCHLER, *Primary Examiner.*

B. BELKIN, *Assistant Examiner.*